(12) United States Patent
Azizi et al.

(10) Patent No.: US 9,210,024 B2
(45) Date of Patent: Dec. 8, 2015

(54) METHODS AND ARRANGEMENTS FOR CHANNEL UPDATES IN WIRELESS NETWORKS

(71) Applicant: INTEL CORPORATION, Santa Clara, CA (US)

(72) Inventors: Shahrnaz Azizi, Cupertino, CA (US); Thomas J. Kenney, Portland, OR (US); Eldad Perahia, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/730,931

(22) Filed: Dec. 29, 2012

(65) Prior Publication Data
US 2014/0050254 A1 Feb. 20, 2014

Related U.S. Application Data

(60) Provisional application No. 61/684,595, filed on Aug. 17, 2012.

(51) Int. Cl.
*H04B 1/38* (2015.01)
*H04L 27/26* (2006.01)
(Continued)

(52) U.S. Cl.
CPC .......... *H04L 27/2666* (2013.01); *H04L 5/0051* (2013.01); *H04L 25/022* (2013.01); *H04L 27/2647* (2013.01)

(58) Field of Classification Search
CPC .............. H04B 1/00; H04B 3/00; H04B 7/00; H04B 14/00; H04B 17/00; H04B 2001/00; H04B 2201/00; H04J 13/00; H04J 2013/00; H03K 7/00; H03K 9/00; H03L 7/00; H04L 1/00; H04L 5/00; H04L 7/00; H04L 25/00; H04L 27/00; H04L 2001/00; H04L 2007/00; H04L 2025/00; H04L 2027/00; H03M 5/00
See application file for complete search history.

(56) References Cited

U.S. PATENT DOCUMENTS

| | | |
|---|---|---|
| 2003/0081695 A1 | 5/2003 | Eilts et al. |
| 2006/0098569 A1 | 5/2006 | Han et al. |

(Continued)

FOREIGN PATENT DOCUMENTS

WO  2014/028132 A1  2/2014

OTHER PUBLICATIONS

International Search Report and Written Opinion received for PCT Patent Application No. PCT/2013/048816, mailed on Oct. 18, 2013, 11 pages.

(Continued)

*Primary Examiner* — Adolf Dsouza
(74) *Attorney, Agent, or Firm* — Schubert Law Group PLLC

(57) ABSTRACT

Logic may determine channel information updates such as channel state information and phase correction information from pilot tones that do not travel close to the DC tone or the band edge tones. Logic may skip channel updates and phase tracking from pilot tones that have traveled close to the DC tone or the edge tones. Logic may use channel estimates and phase rotations that are obtained from previous locations of the pilot tones instead of pilot tones that are adjacent to the DC tone or the edge tones. Logic may access memory to store the channel information such as the phase correction information previously obtained and the channel state information previously obtained and derived from processing pilot tones at locations adjacent to the symbol indices next to the DC tone and the edge tones.

30 Claims, 5 Drawing Sheets

(51) Int. Cl.
  *H04L 5/00* (2006.01)
  *H04L 25/02* (2006.01)

(56) References Cited

U.S. PATENT DOCUMENTS

2006/0109922 A1 5/2006 Gorokhov et al.
2006/0198449 A1 9/2006 De Bart et al.
2009/0190678 A1 7/2009 Jeong
2013/0070713 A1* 3/2013 Stadelmeier et al. ......... 370/329

OTHER PUBLICATIONS

International Preliminary Report on Patentability and Written Opinion received for PCT Patent Application No. PCT/US2013/048816, mailed on Feb. 26, 2015, 7 pages.

* cited by examiner

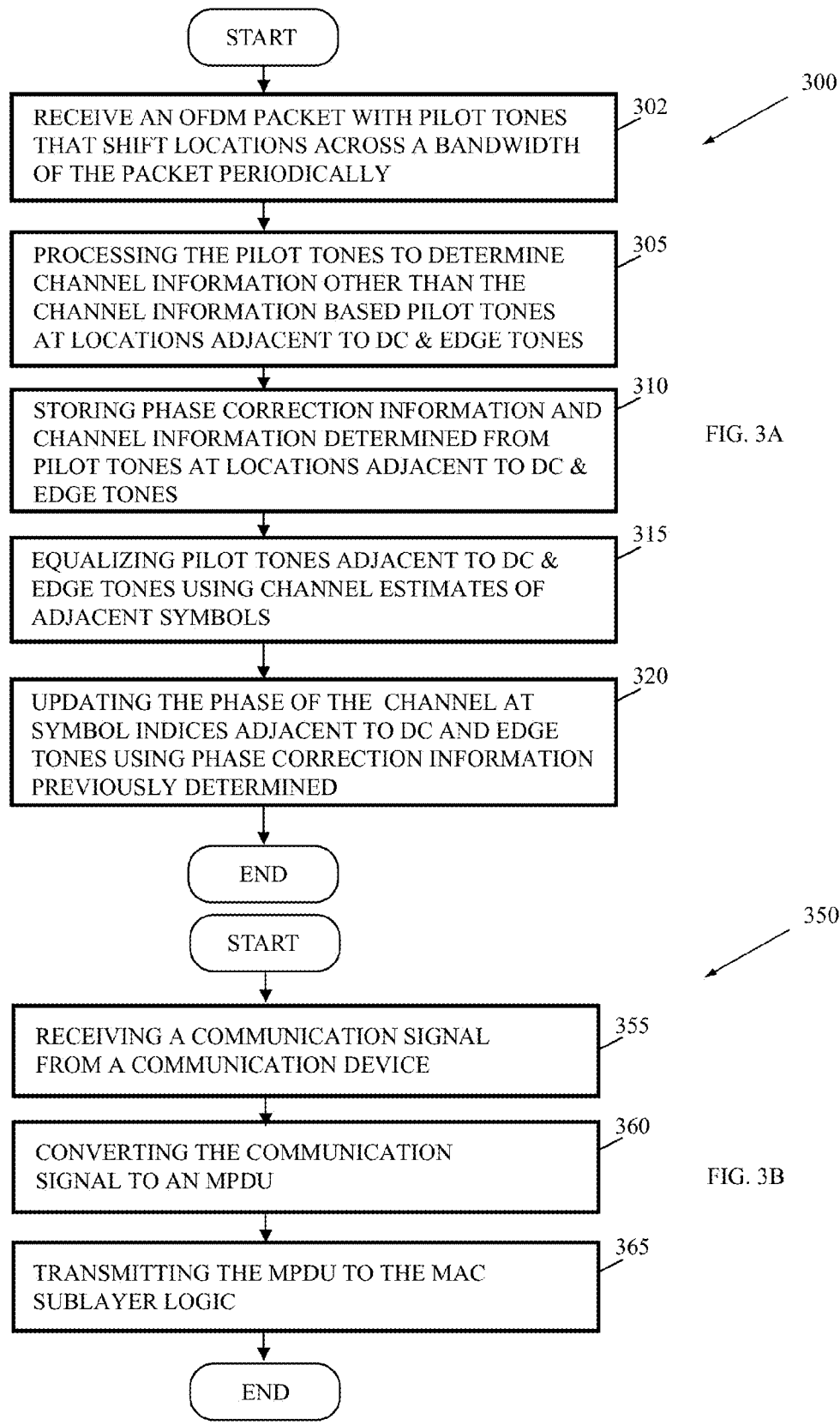

METHODS AND ARRANGEMENTS FOR CHANNEL UPDATES IN WIRELESS NETWORKS

BACKGROUND

Embodiments are in the field of wireless communications. More particularly, the present disclosure relates to channel updates to attenuate the impact of direct current-offset and adjacent channel interference.

BRIEF DESCRIPTION OF THE DRAWINGS

FIGS. 3A-B depict embodiments of flowcharts to process all pilot tones except the tones adjacent to direct current and edge tones and to generate, transmit, receive, parse, and interpret communications.

DETAILED DESCRIPTION OF EMBODIMENTS

Figure 1:
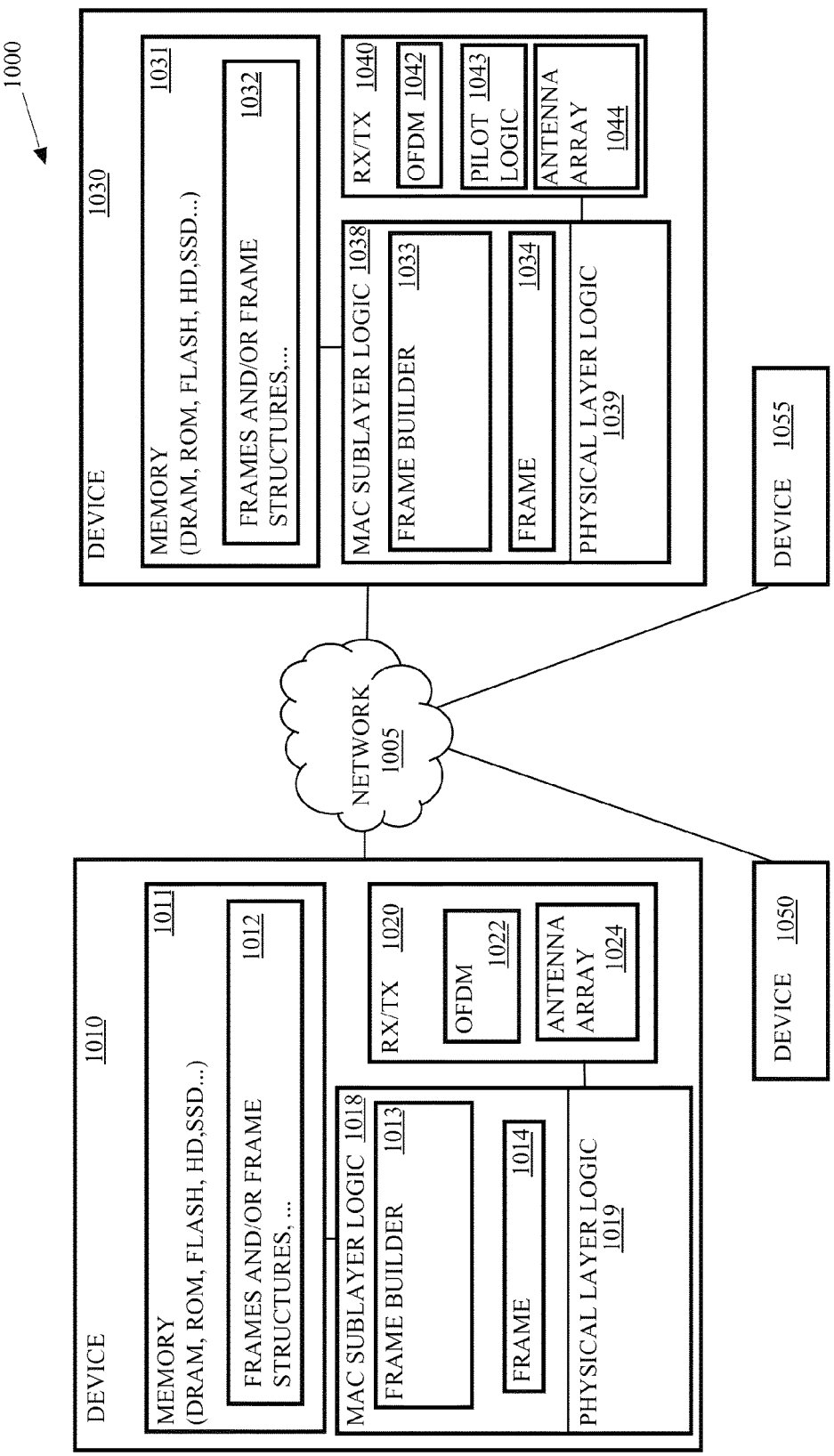
FIG. 1 depicts an embodiment of a wireless network comprising a plurality of communications devices.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

Institute of Electrical and Electronic Engineers (IEEE) 802.11ah systems have bandwidths currently defined are 1 MHz (MegaHertz) and a set of down-clocked IEEE 802.11ac rates, namely 2, 4, 8 and 16 MHz, where the down clocking is 10×. The 1 MHz system may use a 32-point fast Fourier transform (FFT). Of those 32 carriers, 24 will be used for data and 2 for pilot. Additionally, a repetition mode is being included to extend range.

One of the issues for IEEE 802.11ah wireless networks is that with the lower data rates of the IEEE 802.11ah system, and the added use case of outdoor sensor and offloading, the Channel Doppler effect becomes significant for longer packets. For example, using the 1 MHz mode, a packet with moderate to large payload sizes can exceed tens of milliseconds. The packet times were much lower for the IEEE 802.11n/ac system, which was largely designed for indoor use, and thus the channel was assumed stationary over the entire packet. It has been shown that for modest Doppler, the IEEE 802.11ah system performance may be severely degraded without additional training, or channel updates, during the transmission of long packets.

Embodiments may use of known pilot symbol tones shifting across the bandwidth of the orthogonal frequency division multiplexing (OFDM) packet during transmission of the packet to allow receivers to track the channel information during the transmission of the packet. Thus, the pilot information can be used to compute channel updates to the channel state information for those tones and the phase correction information to track channel phase with different tones.

IEEE 802.11ah devices may include, e.g., indoor and outdoor sensors and cellular offloading. Low cost devices are less likely to have stringent filtering and advanced algorithm to compensate for adjacent channel interference (ACI) and direct current (DC) offset. When pilot tones travel toward DC or the bandwidth edge tones, impairments from DC offset and ACI can considerably impair the ability to make accurate estimates. When tones close to the DC tone or the band edge tones are used as data tones, channel coding compensates for the impact of DC-offset or ACI, while if those tones are pilot tones, degradation from DC-offset or ACI propagates to channel estimates and phase tracking that in turn causes overall performance degradation.

Embodiments implement pilot logic that determines channel information updates such as channel state information and phase correction information from pilot tones that do not travel close to the DC tone or the band edge tones. Some embodiments implement pilot logic that allows the skipping of channel updates from pilot tones that have traveled to the symbol index that is adjacent to the DC tone or the band edge tones. In other words, embodiments comprise pilot logic to process the shifting pilot tones except for the pilot tones located adjacent to the DC tones and/or edge tones. In some embodiments, the pilot logic uses channel state information and phase correction information that are determined by processing pilot tones at previous locations of the pilot tones instead of pilot tones that are adjacent to the DC tone or the edge tones. In many embodiments, memory is provided to store the channel information such as the phase correction information previously obtained as well as the channel state information previously obtained and derived from processing pilot tones at locations adjacent to the symbol indices next to the DC tone and the edge tones.

In some embodiments, the pilot logic may process pilot tones at any location within OFDM packet. For instance, the pilot logic may determine to process only pilot tones at the odd symbol indices or subcarriers (e.g., $-11, -9, -7, \ldots$) and to interpolate channel information rather than process pilot tones on even subcarriers ($-12, -10, \ldots$). In further embodiments, the access point may transmit an OFDM packet with pilot tones shifting through only selected locations and the pilot logic may process those pilot tones while interpolating the locations that were not selected.

In many embodiments, transmitters shift the location of the pilot tones every N symbols, where N may be a system parameter, setting, or a fixed value. Thus, the location of the pilot tones remain constant for N symbols before shifting to the next location. In several embodiments, a receiver may then use the N pilot symbols to make a channel estimate using an appropriate algorithm. Some embodiments described herein may implement the pilot shifting with N fixed to a value of one, which it means the pilots would shift every symbol and the implementation of a fixed value for N may also remove a need of signaling between transmitter and receiver to update the value of N because the single value used at the transmitter may be predetermined.

It is understood that embodiments that skip channel estimates and phase correction updates have a degraded performance. However, this degradation may be negligible since skipping pilot tones may happen infrequently, e.g., twice in every 13 OFDM symbols for 1 MHz systems, and even less frequently with 2, 4, 8, and 16 MHz systems where the skipping would be even less frequent. Filtering in phase tracking loop may improve this performance. A simulation study conducted on an embodiment is included herein to illustrate the performance improvements.

Various embodiments may be designed to address different technical problems associated with channel updates with shifting pilot tones. For instance, some embodiments may be designed to address one or more technical problems such as addressing impairments to shifting pilot tones as the pilot tones are shifted toward the DC and/or edge tones for, e.g., low cost sensors that may not have stringent filtering and advanced algorithms to compensate for adjacent channel interference and DC offset.

Different technical problems such as those discussed above may be addressed by one or more different embodiments. For instance, some embodiments that address impairments to shifting pilot tones as the pilot tones travel toward DC and/or edge tones may do so by one or more different technical means such as determining channel information based upon pilot tones that are not at a location adjacent to the DC tone or the edge tones, skipping the processing of pilot tones near the DC tone or near the edge tones, skipping the processing of pilot tones adjacent to the DC tone or adjacent to the edge tones, determining a channel estimation to equalize pilot tones by storing or buffering the previously determined channel state information or channel estimates for a pilot tone adjacent to the symbol index that is adjacent to the DC tone and/or the edge tones, accessing or retrieving the stored channel estimate determined for the pilot tone location that is adjacent to a location next to the DC tone and/or edge tones to equalize the pilot tones, skipping the determination of phase correction information for pilot tones adjacent to the DC tone and/or edge tones, storing phase correction information for the previous pilot tone location and utilizing the stored phase correction information for phase tracking, and the like.

Some embodiments implement Institute of Electrical and Electronic Engineers (IEEE) 802.11 systems such as IEEE 802.11ah systems and other systems that operate in accordance with standards such as the IEEE 802.11-2012, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/getieee802/download/802.11-2012.pdf).

Several embodiments comprise access points (APs) for and/or client devices of APs or stations (STAs) such as routers, switches, servers, workstations, netbooks, mobile devices (Laptop, Smart Phone, Tablet, and the like), as well as sensors, meters, controls, instruments, monitors, appliances, and the like. Some embodiments may provide, e.g., indoor and/or outdoor "smart" grid and sensor services. For example, some embodiments may provide a metering station to collect data from sensors that meter the usage of electricity, water, gas, and/or other utilities for a home or homes within a particular area and wirelessly transmit the usage of these services to a meter substation. Further embodiments may collect data from sensors for home healthcare, clinics, or hospitals for monitoring healthcare related events and vital signs for patients such as fall detection, pill bottle monitoring, weight monitoring, sleep apnea, blood sugar levels, heart rhythms, and the like. Embodiments designed for such services may generally require much lower data rates and much lower (ultra low) power consumption than devices provided in IEEE 802.11n/ac systems.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. The one or more antennas may couple with a processor and a radio to transmit and/or receive radio waves. For instance, multiple-input and multiple-output (MIMO) is the use of radio channels carrying signals via multiple antennas at both the transmitter and receiver to improve communication performance.

While some of the specific embodiments described below will reference the embodiments with specific configurations, those of skill in the art will realize that embodiments of the present disclosure may advantageously be implemented with other configurations with similar issues or problems.

Turning now to FIG. 1, there is shown an embodiment of a wireless communication system 1000. The wireless communication system 1000 comprises a communications device 1010 that may be wire line and wirelessly connected to a network 1005. The communications device 1010 may communicate wirelessly with a plurality of communication devices 1030, 1050, and 1055 via the network 1005. The communications device 1010 may comprise an access point. The communications device 1030 may comprise a low power communications device such as a sensor, a consumer electronics device, a personal mobile device, or the like. And communications devices 1050 and 1055 may comprise sensors, stations, access points, hubs, switches, routers, computers, laptops, netbooks, cellular phones, smart phones, PDAs (Personal Digital Assistants), or other wireless-capable devices. Thus, communications devices may be mobile or fixed. For example, the communications device 1010 may comprise a metering substation for water consumption within a neighborhood of homes. Each of the homes within the neighborhood may comprise a sensor such as the communications device 1030 and the communications device 1030 may be integrated with or coupled to a water usage meter.

When the communications device 1010 transmits a packet to the communications device 1030 to notify the communications device 1030 that, e.g., the communications device 1010 is buffering data for the communications device 1030, the communications device 1010 may transmit an orthogonal frequency division multiplexing (OFDM) packet encapsulating a frame 1014. The OFDM 1022 of the transceiver (RX/TX) 1020 may generate the transmission with pilot tones shifting locations within the symbol indices of the transmission every N symbols. In some embodiments, the communications device 1010 may have previously transmitted an indication of the value of N to the communications device 1030. In further embodiments, the value of N may be a fixed value. And, in some embodiments, the value of N is fixed at a value of one.

The communications device 1010 may transmit the OFDM packet one symbol after the other sequentially and every N symbols, the location of the pilot tones within the OFDM packet may change either sequentially or randomly. In some embodiments, the location of the pilot tones may shift by one symbol index, or, in other words, from one sub-carrier to the adjacent sub-carrier.

Pilot tone shifting is a process where the pilot tones are sequentially assigned to different subcarriers as a function of time. In many embodiments, only a subset of subcarriers may be used for pilot tones or data purposes (usable sub-carriers). For example, the pilot tones may be used only on data sub-carriers (e.g., sweep through with the pilot tone on a symbol by symbol basis), may avoid nulled sub-carriers (e.g., DC subcarriers and guard subcarriers), an, in some embodiments, may even avoid data tones that are adjacent to guard or DC subcarriers.

Figures 1A, 1B:
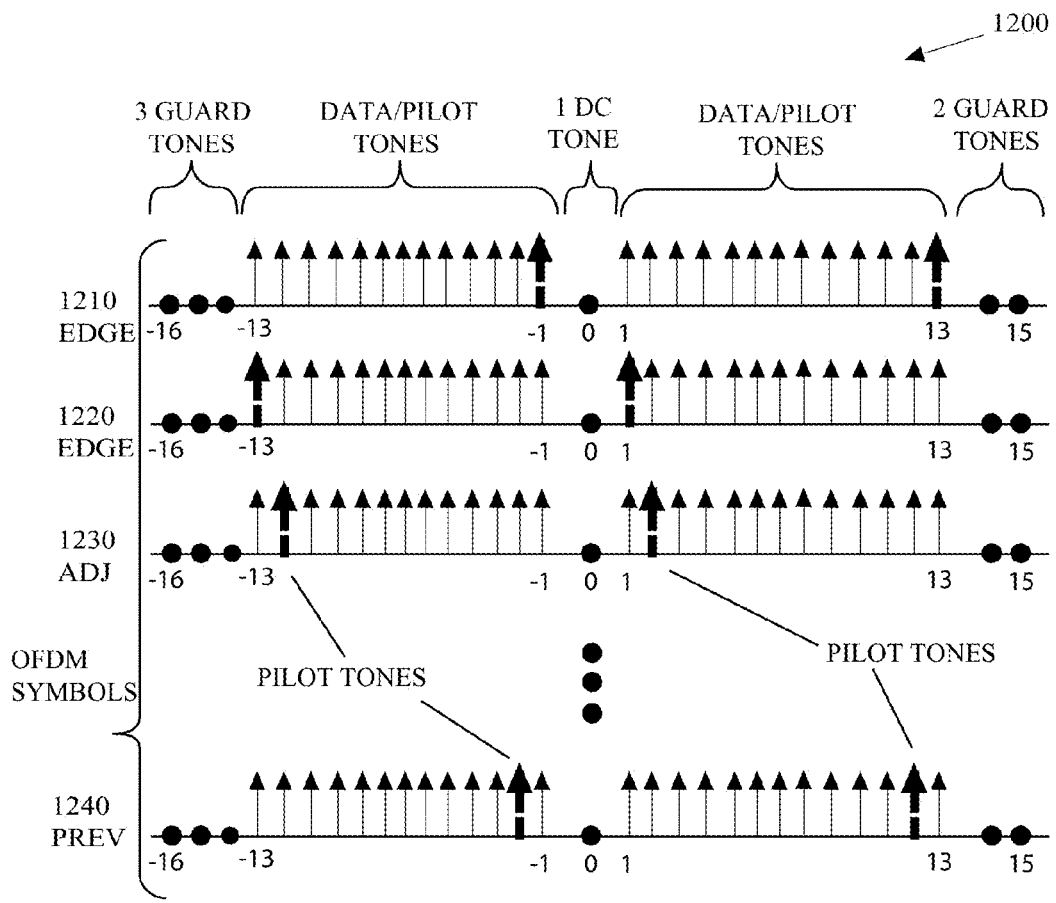
FIG. 1A depicts an embodiment of a table illustrating pilot tone locations and processing pilot tones except for the pilot tones at locations near the DC and edge tones.
FIG. 1B depicts embodiments of orthogonal frequency division multiplexing (OFDM) symbols in an OFDM packet transmission with shifting pilot tones.

The pilot tones and their positioning can be based on channel conditions such as coding scheme, packet length, and the like. FIG. 1A depicts a table 1100 of pilot tone positions demarked by symbol numbers. The following discussion is for the 1 MHz systems and is an example. There are other allocations for the 2, 4, 8 and 16 MHz bandwidths.

The table 1100 shows a progression of symbols transmitted from the communications device 1010 to the communications device 1030 from 1 to 13. The number of symbols is chosen in the present embodiment based upon the number of data and pilot tones, or useable sub-carriers, and the pattern of pilot locations in relation to the symbol indices repeat after 13. In particular, the table 1100 illustrates two pilot tones for each symbol number. One pilot tone travels between the —13 symbol index and a —1 symbol index and the second pilot tone travels between the 1 symbol index and the 13 symbol index. For example, the first symbol transmitted may be symbol 1, which has two pilot tones, one located at the symbol index −8 and one located at the symbol index 6. The second symbol transmitted may then be symbol 2 with pilot tones at the symbol indices −9 and 5. The third symbol transmitted may then be symbol 3 with pilot tones at the symbol indices −10 and 4 and these pilot tone shifts continue through symbol 13 at which the pilot tones are at the symbol indices −7 and 7.

As shown in the table 1100, the pilot tones are shifted or assigned to different tones (sub-carriers) or frequency bins as a function of time, which is referred to herein as the locations of the pilot tone. The time between shifts in the location of the pilot tones is N=1 in table 1100 so the pilot tones shift between locations between every symbol. The table 1100 also illustrates the pilot tones changing by one symbol index at a time and sequentially. However, not all embodiments may implement a location for pilot tones as a function of time that results in the pilot tones shifting through sub-carriers or frequencies sequentially. In other words, the location of the pilot tones may shift every N symbols {N=1, 2, 3, 4 . . . , 8, . . . } but the shift in frequency/location may be random within the subset of sub-carriers rather than sequential. The shifting of the pilot tones can also be based on the modulation and coding scheme (MCS) used for transmission or on the packet length of the transmission (i.e., channel conditions). Further, the amount of time the one or more pilot tones occupy a particular location could be based on a modulation and coding scheme (MCS) and the MCS may be selected based on a data rate and a level of robustness required by traffic type. After a set of pilot tones are assigned, the process illustrated by the table 1100 is cyclic and may be repeated over any number of symbols greater than 13.

The communications device 1030 may receive the transmission from the communications device 1010 and may utilize channel information determined by processing the pilot tones to repeatedly or, in some embodiments, continually update the channel information with all pilot information except information determined from pilot tones at locations adjacent to the DC tone or edge tones. The communications device 1030 may implement pilot logic 1043 to receive and process the pilot tones to determine channel information (sometimes referred to as pilot information) and to use the channel information to update processing of the data signals received for the OFDM packet. The pilot logic 1043 may also store the channel information for locations adjacent to the locations that are next to the DC tones or edge tones for later retrieval such as when the pilot tones advance into locations that are next to the DC tone or edge tones.

In some embodiments, the pilot logic 1043 may comprise logic to determine channel estimates and phase corrections to update weights associated with sub-carriers in the OFDM packet and phase corrections to correct the phases of sub-carriers in the channel used to transmit the OFDM packet. In many embodiments, the pilot logic 1043 will continuously update the channel state information and the phase correction information with each symbol received.

In the present embodiment, the pilot logic 1043 may receive the OFDM packet with pilot tones distributed across the bandwidth of the OFDM packet in accordance with the table 1100. The table 1100 provides an example of a pattern for 1 MHz system (32 tones FFT, 24 data and 2 pilot tones in each symbol) based on which pilots travel one symbol to another covering the entire bandwidth after 13 symbols. The pattern repeats periodically to cover all symbols in a packet.

In other embodiments, 1 MHz receivers use all pilot locations to update channel estimates and track phase throughout the OFDM packet. In the present embodiment, the communications device 1030 may be a low cost receiver that does not have stringent DC-offset and ACI filtering. In the present embodiment, the pilot logic 1043 may skip processing pilot tones that are close to DC and/or edge tones. As illustrated in the table 1100, symbol indices 6 and 7, and their periodic occurrence on every 13 symbols have pilot tones at locations {−13,1} and {−1, 13} that are next to DC or edge tones. For these indices 6 and 7, the pilot logic 1043 uses channel updates obtained previously from indices 5 and 8, respectively. In other words, the pilot logic 1043 equalizes pilot tones of indices 6 and 7 using channel estimates previously obtained from adjacent tones in indices 5 and 8, respectively. However, for phase tracking, to avoid any sudden jump in the slope and step of phase correction, the pilot logic 1043 continues to use previously obtained phase correction data. In other words, in the phase tracking routine, the pilot logic 1043 at symbol index 6 uses phase information obtained from symbol index 5, and at symbol index 7, the pilot logic 1043 uses phase correction of index 6 (which is actually the same information previously obtained at symbol index 5) and so on.

FIG. 1B illustrates an embodiment of the OFDM packet 1200 transmitted from the communications device 1010 to the communications device 1030. The OFDM module 1022 may generate different OFDM symbols for different bandwidths such a 2 MHz, 4 MHz, 8 MHz, and 16 MHz and may generate the OFDM packet 1200 for a 1 MHz bandwidth channel, for transceivers such as the transceivers of FIG. 1, corresponding to a 32-point, inverse Fourier transform. The OFDM packet 1200 comprises 32 tones, also referred to as sub-carriers, indexed from −16 to 15. The 32 tones, in this embodiment, include 24 data tones, five guard tones, two pilot tones, and one direct current (DC) tone. The four lowest frequency tones are guard tones provided for filter ramp up and filter ramp down. The index zero frequency tone is the DC tone and is provided for mitigating radio frequency interference. The DC tone may comprise a tone at the carrier frequency, e.g., 1 MHz. And the data and pilot frequency tones are provided between indices −13 through −1 and indices 1 through 13.

The RF receiver comprises an OFDM module 1042, which receives electromagnetic energy at an RF frequency and extracts the digital data therefrom. For 1 MHZ operation, OFDM 1042 may extract OFDM symbols comprising 24 data tones, five guard tones, and one DC tone such as the OFDM symbol 1210 illustrated in FIG. 1B. In other embodiments, the OFDM symbols may be encoded in other manners with different numbers of data tones, pilot tones, and guard tones.

Note that the OFDM packet 1200 comprises OFDM symbols 1210, 1220, 1230, through 1240 and the OFDM symbols correspond to the pilot tone pattern illustrated in table 1100. In particular, the OFDM symbols 1210-1240 illustrate a dot for each of the guard tones, which are also referred to as edge tones. There is one dot in the center of the symbols 1210-1240 illustrating the position of the DC tone as symbol index 0, and the DATA/PILOT TONES are demarked with numbers that start at the symbol index −13 on the left side through the −1 index next to the DC tone at the 0 index, and continue with index 1 adjacent to the DC index 0 through the index 13 adjacent to the guard tones on the right side.

As indicated in with respect to table 1100, in the present embodiment, the pilot logic 1043 may skip processing pilot tones that are close to DC or edge tones. The OFDM symbol 1220 illustrates the OFDM symbol index 6 in table 1100 and the pilot tones are the emboldened arrows at symbol indices {−13, 1}. Note that the OFDM symbol 1210 has pilot tones {−1, 13} adjacent to the DC tone and the guard tones. The OFDM symbol 1220 has pilot tones {−13, 1} adjacent to the DC tone and the guard tones. The OFDM symbol 1230 has pilot tones {−12, 2} adjacent to the location of the symbol index that is adjacent to the DC tone and the guard tones. And, the OFDM symbol 1230 has pilot tones {−2, 12} adjacent to the location of the symbol index that is adjacent to the DC tone and the guard tones.

In the present embodiment, the pilot logic 1043 may use channel updates obtained previously by processing the pilot tones from symbol indices 5 and 8, which are OFDM symbols 1230 and 1240, respectively. For phase tracking, the pilot logic 1043 continues to use previously obtained phase correction data. In other words, in the phase tracking routine, the pilot logic 1043 may use the phase correction information obtained by processing the pilot tones of OFDM symbol 1230 at the OFDM symbol 1220 as well as at the OFDM symbol 1210.

In further embodiments, the communications device 1010 may facilitate data offloading. For example, communications devices that are low power sensors may include a data offloading scheme to, e.g., communicate via Wi-Fi, another communications device, a cellular network, or the like for the purposes of reducing power consumption consumed in waiting for access to, e.g., a metering station and/or increasing availability of bandwidth. Communications devices that receive data from sensors such as metering stations may include a data offloading scheme to, e.g., communicate via Wi-Fi, another communications device, a cellular network, or the like for the purposes of reducing congestion of the network 1005.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples communications devices 1010, 1030, 1050, and 1055.

The communication devices 1010 and 1030 comprise memory 1011 and 1031, medium access control (MAC) sublayer logic 1018 and 1038, and physical layer (PHY) logic 1019 and 1039, respectively. The memory 1011 and 1031 may comprise a storage medium such as dynamic random access memory (DRAM), read only memory (ROM), buffers, registers, cache, flash memory, hard disk drives, solid-state drives, or the like. The memory 1011 and 1031 may store frames and/or frame structures, or portions thereof such as structures for an association request frame, an association response frame, a probe frame, and the like.

The MAC sublayer logic 1018, 1038 may comprise logic to implement functionality of the MAC sublayer of the data link layer of the communications device 1010, 1030. The MAC sublayer logic 1018, 1038 may generate the frames and the physical layer logic 1019, 1039 may generate physical layer protocol data units (PPDUs) based upon the frames. For example, the frame builder may generate frames 1014, 1034. The physical layer logic 1019, 1039 may encapsulate the frames with preambles to generate PPDUs for transmission via a physical layer device such as the transceivers represented by receive/transmit chains (RX/TX) 1020 and 1040.

The communications devices 1010, 1030, 1050, and 1055 may each comprise a transceiver (RX/TX) such as transceivers (RX/TX) 1020 and 1040. In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal sub-carrier signals are used to carry data as OFDM symbols. The OFDM symbols are divided into several parallel data streams or channels, one for each sub-carrier and encoded with the sub-carriers by which the OFDM symbols will be transmitted to a receiving device such as twenty-four data sub-carriers, five guard sub-carriers, two pilot sub-carriers, and one DC subcarrier. Each sub-carrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling. Data tones are used to transfer information between the transmitter and receiver via one of the channels. Pilot tones are used to maintain the channels, and may provide information about time/frequency and channel tracking. Guard intervals may be inserted between symbols such as between every OFDM symbol as well as between the short training field (STF) and long training field (LTF) symbols during transmission of the training sequence to avoid inter-symbol interference (ISI), which might result from multi-path distortion. Guard tones may help the signal conform to a spectral mask. The nulling of the direct component (DC) may be used to simplify direct conversion receiver designs.

Each transceiver 1020, 1040 comprises an RF transmitter and an RF receiver. The RF transmitter comprises an OFDM module 1022, which impresses digital data, OFDM symbols encoded with tones, onto RF frequencies, also referred to as sub-carriers, for transmission of the data by electromagnetic radiation. In the present embodiment, the OFDM module 1022 may impress the digital data as OFDM symbols encoded with tones onto the sub-carriers to for transmission.

FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system. In the alternative, FIG. 1 may depict transceivers that include multiple antennas and that may be capable of multiple-user MIMO (MU-MIMO) operation.

The antenna array 1024 is an array of individual, separately excitable antenna elements. The signals applied to the elements of the antenna array 1024 cause the antenna array 1024 to radiate one to four spatial channels. Each spatial channel so formed may carry information to one or more of the communications devices 1030, 1050, and 1055. Similarly, the communications device 1030 comprises a transceiver 1040 to receive and transmit signals from and to the communications device 1010. The transceiver 1040 may comprise an antenna array 1044.

Figure 1C:
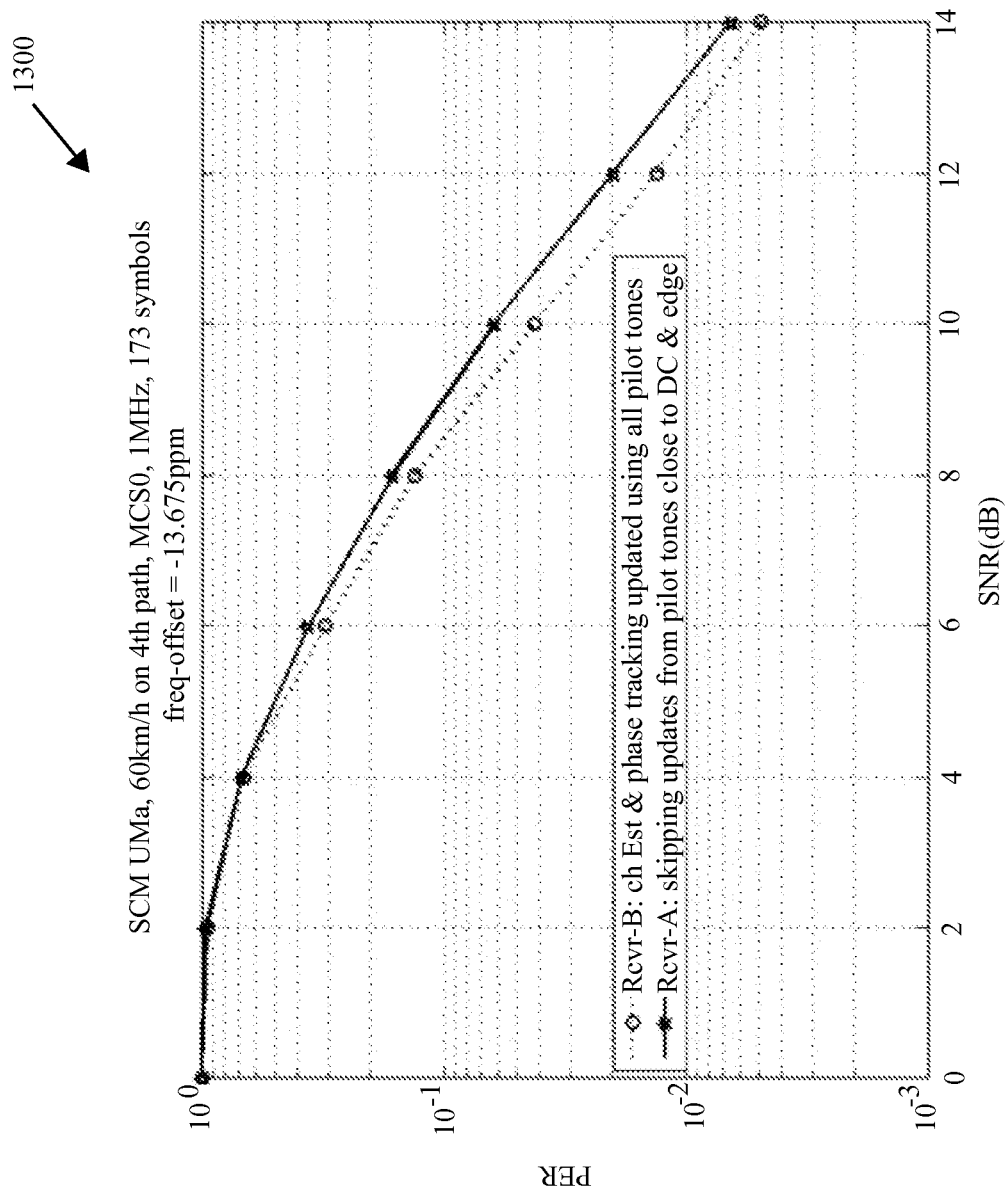
FIG. 1C depict embodiments of a simulation comparing the processing of all pilot tones against processing pilot tones except for the pilot tones at locations near the DC and edge tones.

FIG. 1C depicts embodiments of a simulation 1300 of the process implemented in the pilot logic 1043 of skipping channel estimates and phase correction updates derived directly from the pilot tones at locations that are adjacent to the DC tone or the edge tones. However, as illustrated in the simulation results, the expected degradation may be negligible since skipping pilot tones happens very infrequently (twice in every 13 symbols) and the filtering in phase tracking loop is able to pull the performance back within a threshold range. In FIG. 1C, the graph shows packet error rate (PER) performance of two receivers. Receiver-A implements the pilot logic such as pilot logic 1043 in which pilot tones close to DC-offset and the edge are not used to update channel estimates and phase correction. Receiver-B is a normal receiver that considers updates from all traveling pilots. It is observed that the pilot logic 1043 in the low cost receiver-A follows the performance of Receiver-B with only 0.5 decibel (dB) degradation. This simulation study was conducted with the modulation and coding scheme zero (MCS0) in an IEEE 802.11ah device operating at 1 MHz using a 256-byte packet using all simulation impairments and a carrier offset of −13.675 parts per million (ppm).

Therefore, the pilot logic 1043 may be implemented in low cost sensor devices without need of any stringent requirement on DC-offset and/or ACI rejection while maintaining performance to within 0.5 dB of that of the high-end receivers.

Figure 2:
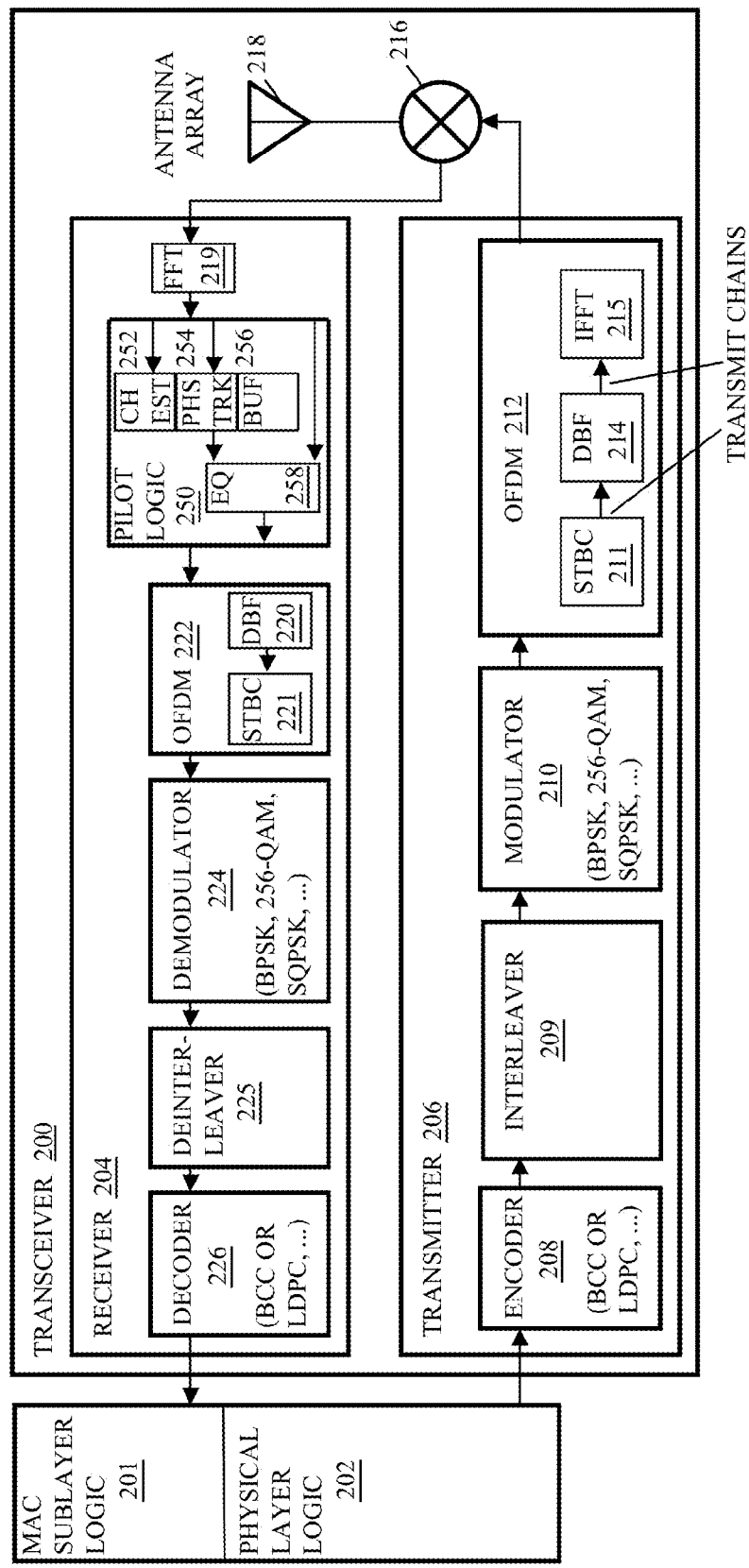
FIG. 2 depicts an embodiment of an apparatus with pilot logic to process shifting pilot tones.

FIG. 2 depicts an embodiment of an apparatus to generate, transmit, receive, and interpret or decode frames. The apparatus comprises a transceiver 200 coupled with Medium Access Control (MAC) sublayer logic 201 and a physical layer (PHY) logic 250. The MAC sublayer logic 201 may determine a frame and the physical layer (PHY) logic 250 may determine the PPDU by encapsulating the frame or multiple frames, MAC protocol data units (MPDUs), with a preamble to transmit via transceiver 200. For example, a frame builder may generate a frame including a type field that specifies whether the frame is a management, control or data frame and a subtype field to specify the function of the frame. A control frame may include a Ready-To-Send or Clear-To-Send frame. A management frame may comprise a Beacon, Probe Response, Association Response, and Reassociation Response frame type. And the data type frame is designed to transmit data.

In many embodiments, the MAC sublayer logic 201 may comprise a frame builder 202 to generate frames. The PHY logic 250 may comprise a data unit builder 203. The data unit builder 203 may determine a preamble to encapsulate the MPDU or more than one MPDUs to generate a PPDU. In many embodiments, the data unit builder 203 may create the preamble based upon communications parameters chosen through interaction with a destination communications device.

The transceiver 200 comprises a receiver 204 and a transmitter 206. The transmitter 206 may comprise one or more of an encoder 208, a modulator 210, an OFDM 212, and a DBF 214. The encoder 208 of transmitter 206 receives and encodes data destined for transmission from the MAC sublayer logic 202 with, e.g., a binary convolutional coding (BCC), a low density parity check coding (LDPC), and/or the like. The modulator 210 may receive data from encoder 208 and may impress the received data blocks onto a sinusoid of a selected frequency via, e.g., mapping the data blocks into a corresponding set of discrete amplitudes of the sinusoid, or a set of discrete phases of the sinusoid, or a set of discrete frequency shifts relative to the frequency of the sinusoid.

The output of modulator 209 is fed to an orthogonal frequency division multiplexing (OFDM) module 212. The OFDM module 212 may comprise a space-time block coding (STBC) module 211, a digital beamforming (DBF) module 214, and an inverse, fast Fourier transform (IFFT) module 215. The STBC module 211 may receive constellation points from the modulator 209 corresponding to one or more spatial streams and may spread the spatial streams to a greater number of space-time streams (also generally referred to as data streams). In some embodiments, the STBC 211 may be controlled to pass through the spatial streams for situations in which, e.g., the number of spatial streams is the maximum number of space-time streams. Further embodiments may omit the STBC.

The OFDM module 212 impresses or maps the modulated data formed as OFDM symbols onto a plurality of orthogonal sub-carriers so the OFDM symbols are encoded with the sub-carriers or tones. The OFDM module 212 may generate symbols in which the pilot tones change location within the data/pilot sub-carriers every N symbols. In many embodiments, the OFDM module 212 may generate symbols in which the pilot tones shift locations along the symbol indices sequentially. In several embodiments, the pilot tones may shift locations every symbol. For instance, when the communications device 1030 in FIG. 1 responds to a transmission from the communications device 1010, the RX/TX 1040 may respond with OFDM packets in which the pilot tones shift every N symbols. In some embodiments, the value of N may match the value of N provided by the communications device 1010. In other embodiments, the value of N may be a fixed value for the communications device 1030 and/or for the communications device 1010. And, in some embodiments, the communications device 1010, which may be the access point, may use a value of N provided to the communications device 1010 by the communications device 1030.

In some embodiments, the OFDM symbols are fed to the Digital Beam Forming (DBF) module 214. Digital beam forming techniques may be employed to increase the efficiency and capacity of a wireless system. Generally, digital beam forming uses digital signal processing algorithms that operate on the signals received by, and transmitted from, an array of antenna elements. For example, a plurality of spatial channels may be formed and each spatial channel may be steered independently to maximize the signal power transmitted to and received from each of a plurality of user terminals. Further, digital beam forming may be applied to minimize multi-path fading and to reject co-channel interference.

The OFDM module 212 may also comprise an inverse Fourier transform module that performs an inverse discrete Fourier transform (IDFT) on the OFDM symbols. In the present embodiment, the IDFT may comprise the IFFT module 215, to perform an IFFT on the data. For 1 MHz bandwidth operation, the IFFT module 215 performs a 32-point, inverse FFT on the data streams.

The output of the OFDM module 212 may be up-converted to a higher carrying frequency or may be performed integrally with up-conversion. Shifting the signal to a much higher frequency before transmission enables use of an antenna array of practical dimensions. That is, the higher the transmission frequency, the smaller the antenna can be. Thus, an up-converter multiplies the modulated waveform by a sinusoid to obtain a signal with a carrier frequency that is the sum of the central frequency of the waveform and the frequency of the sinusoid.

The transceiver 200 may also comprise duplexers 216 connected to antenna array 218. Thus, in this embodiment, a single antenna array is used for both transmission and reception. When transmitting, the signal passes through duplexers 216 and drives the antenna with the up-converted information-bearing signal. During transmission, the duplexers 216 prevent the signals to be transmitted from entering receiver 204. When receiving, information bearing signals received by the antenna array pass through duplexers 216 to deliver the signal from the antenna array to receiver 204. The duplexers 216 then prevent the received signals from entering transmitter 206. Thus, duplexers 216 operate as switches to alternately connect the antenna array elements to the receiver 204 and the transmitter 206.

The antenna array 218 radiates the information bearing signals into a time-varying, spatial distribution of electromagnetic energy that can be received by an antenna of a receiver. The receiver can then extract the information of the received signal.

The transceiver 200 may comprise a receiver 204 for receiving, demodulating, and decoding information bearing communication signals. The communication signals may comprise, e.g., 32 tones on a 1 MHz carrier frequency with pilot tones that shift every N symbols. For example, a data collection station compliant with IEEE 802.11ah for a farm may periodically receive data from low power sensors that have integrated wireless communications devices compliant with IEEE 802.11ah. The sensors may enter a low power mode for a period of time, wake to collect data periodically, and communicate with the data collection station periodically to transmit the data collected by the sensor. In some embodiments, the sensor may proactively initiate communications with the data collection station, transmit data indicative of a communications capability, and begin communicating the data to the data collection station in response to a clear-to-send (CTS) or the like. In other embodiments, the sensor may transmit data to the data collection station in response to initiation of communications by the data collection station.

The receiver 204 may comprise a fast Fourier transform (FFT) module 219. The FFT module 219 may transform the communication signals from the time domain to the frequency domain.

The receiver 204 may comprise a pilot logic 250 comprising a channel estimator 252, a phase tracker 254, a buffer 256, and an equalizer 258. The pilot logic 250 may be configured for processing shifting pilot tones as well as data tones. The receiver 204 may comprise an equalizer 258 with hard-coded logic or running an equalizer application or instructions, a channel estimator 252, and a phase tracker 254.

The pilot logic 250 may comprise filters, delay elements, and taps or other logic to apply weighting functions to the input signal based upon weight values determined and updated from processing the pilot tones in the incoming signal. The weight coefficients for the weighting functions are weight values which may be adjusted based on the pilot tones to achieve a specific level of performance, and to, e.g., optimize signal quality at the receiver. In some embodiments, the pilot logic 250 is able to track channel changes over time (i.e., using the pilot tones to update the equalizer weight coefficients) because of the rotation of the pilot tones through each of the OFDM subcarriers over the OFDM packet through time. As noted above, the pilot tones are separated by some number of data subcarriers so that estimation of slope and intercept for subcarrier tracking could be maintained. As the pilot tones are shifted through symbol index locations across the band of the OFDM packet, the weight coefficients for the equalizer for the subcarriers that the pilot tones currently populate may be updated as well.

The receiver 204 may receive and convert the pilot tones to a baseband representation. The received pilot tones may then be input into the channel estimator 252 that uses the received sequences to determine initial channel estimates for the wireless channel (using, for example, a least squares approach). The channel estimator 252 may have a priori knowledge of the transmitted pilot tones, which it compares to the received signals to determine the initial channel estimates. The initial channel estimates may then be delivered to the phase tracker 254.

The baseband representation of the received data signals may be delivered to the input of the equalizer 258, which filters the signals in a manner dictated by the weighting function in accordance with the weight coefficients currently being applied to the equalizer 258. The equalizer 440 may include any type of equalizer structure (including, for example, a transversal filter, a maximum likelihood sequence estimator (MLSE), and others). When properly configured, the equalizer 258 may reduce or eliminate undesirable channel effects within the received signals (e.g., inter-symbol interference).

The received data signals with pilot tones 210 are also delivered to the input of the phase tracker 254, which uses the received signals to track the weight coefficients applied to the equalizer 258. During system operation, the phase tracker 254 regularly updates the weight coefficients based on the magnitude and phase of the pilot tones. In addition to the receive data, the phase tracker 254 also receives data from an output of the equalizer 258 as feedback for use in the phase tracking or phase correction process. The phase tracker 254 uses the initial channel estimates determined by the channel estimator 252 to determine the weight coefficients covariance matrix (C). The phase tracker 254 may then determine the value of the constant b (related to the channel changing rate) and calculate the weight coefficients changing covariance matrix (b*C). The square root of the weight coefficients changing covariance matrix may then be determined and used within a modified least mean square (LMS) algorithm to determine the updated channel weight coefficients, which are then applied to the equalizer 258.

The pilot logic 250 also comprises a buffer 256 to store channel information such as channel estimates generated by the channel estimator 252 and phase correction information from the phase tracker 254. In some embodiments, the pilot logic 250 may store only the previously obtained channel information for pilot locations that are adjacent to the pilot locations next to the DC tone or next to the edge tones of the OFDM symbols as well as previously obtained phase correction information determined from pilot tones that are adjacent to a location that is next to the DC tone or the edge tones of the OFDM symbols.

In several embodiments, the pilot logic 250 may skip processing the pilot tones that are next to, or adjacent to, the DC tone and the edge tones and, instead, utilize the channel state information and the phase correction information from the buffer 256. For instance, if an edge tone or a DC tone is at a first location, when a pilot tone shifts from an adjacent location to the first location, the pilot logic 250 will store the channel state information for the adjacent location and the phase correction information for the adjacent location in the buffer 256 for use in subsequent channel updates and phase correction updates. While receiving symbols while the pilot tone is at the first location, the pilot logic 250 may access the buffer 256 to use the channel state information and phase correction information in the buffer from the adjacent location. Then, if the pilot tone shifts to a subsequent location that is not adjacent to the DC tone or the edge tones, the pilot logic 250 may return to processing the pilot tones at that location to determine channel state information and phase correction information for updating the weight coefficients.

On the other hand, if the subsequent location is also adjacent to the DC tone or the edge tones, the pilot logic 250 may retrieve the previously determined channel state information for next location to which the pilot tone will shift, which may not be adjacent to the DC tone or the edge tones, and the pilot logic 250 may use this channel state information to update the weight coefficients. For the phase correction information, the pilot logic 250 may access the buffer 256 to obtain the phase correction information previously calculated at a pilot location that is not adjacent to the DC tone or the edge tones.

In some embodiments, the pilot tones may not reach locations adjacent to the DC tone or the edge tones at the same time. These embodiments operate in the same manner because storing the pilot tone information in the buffer and accessing the previously obtained information from the buffer can be implemented on each of the pilot tones independently. For instance, some embodiments may shift a first pilot tone to a location that is adjacent to the DC tone while a second pilot tone is not adjacent to the DC tone or the edge tones. In such embodiments, the pilot logic 250 may access the buffer 256 to determine the previously obtained channel state information and phase correction information for the first pilot tone but process the second pilot tone to determine the channel state information and the phase correction information.

In some embodiments, there is a possibility that a pilot tone may shift to three different locations that are adjacent to the edge tones or the DC tone such as embodiments, for instance, that shift pilot tones to randomly selected locations. In such embodiments, the pilot logic 250 may follow the same general rule to determine the previously determined phase correction information and the previously obtained channel state information for an adjacent location that is not adjacent to the DC tone or the edge tones.

In some embodiments, the pilot logic 250 may skip pilot tones at any location within OFDM packet. In one embodiment, the pilot logic 250 may determine to process only pilot tones at the odd symbol indices or subcarriers (e.g., −11, −9, −7, . . . ) and to interpolate channel information rather than process pilot tones on even subcarriers (−12,−10, . . . ). In further embodiments, the access point may transmit an OFDM packet with pilot tones shifting through only selected locations and the pilot logic 250 may process those pilot tones while interpolating the locations that were not selected.

The receiver 204 may also comprise an OFDM module 222, a demodulator 224, a deinterleaver 225, and a decoder 226, and the equalizer 258 may output the weighted data signals for the OFDM packet to the OFDM module 222. The OFDM 222 extracts signal information as OFDM symbols from the plurality of subcarriers onto which information-bearing communication signals are modulated. For instance, the OFDM symbols may comprise data associated with 24 data sub-carriers, two pilot sub-carriers, five guard sub-carriers, and one DC sub-carrier.

The OFDM module 222 may comprise a DBF module 220, and an STBC module 221. The received signals are fed from the equalizer to the DBF module 220 transforms N antenna signals into L information signals. And the STBC module 221 may transform the data streams from the space-time streams to spatial streams. In one embodiment, the demodulation is performed in parallel on the output data of the FFT. In another embodiment, a separate demodulator 224 performs demodulation separately.

The demodulator 224 demodulates the spatial streams. Demodulation is the process of extracting data from the spatial streams to produce demodulated spatial streams. The method of demodulation depends on the method by which the information is modulated onto the received carrier signal and such information is included in the transmission vector (TX-VECTOR) included in the communication signal. Thus, for example, if the modulation is BPSK, demodulation involves phase detection to convert phase information to a binary sequence. Demodulation provides to the deinterleaver 225 a sequence of bits of information.

The deinterleaver 225 may deinterleave the sequence of bits of information. For instance, the deinterleaver 225 may store the sequence of bits in columns in memory and remove or output the bits from the memory in rows to deinterleave the bits of information. The decoder 226 decodes the deinterleaved data from the demodulator 224 and transmits the decoded information, the MPDU, to the MAC sublayer logic 202.

Persons of skill in the art will recognize that a transceiver may comprise numerous additional functions not shown in FIG. 2 and that the receiver 204 and transmitter 206 can be distinct devices rather than being packaged as one transceiver. For instance, embodiments of a transceiver may comprise a Dynamic Random Access Memory (DRAM), a reference oscillator, filtering circuitry, synchronization circuitry, an interleaver and a deinterleaver, possibly multiple frequency conversion stages and multiple amplification stages, etc. Further, some of the functions shown in FIG. 2 may be integrated. For example, digital beam forming may be integrated with orthogonal frequency division multiplexing.

The MAC sublayer logic 201 may decode or parse the MPDU or MPDUs to determine the particular type of frame or frames included in the MPDU(s).

FIGS. 3A-B depict embodiments of flowcharts to process all pilot tones except the tones adjacent to direct current and edge tones and to generate, transmit, receive, parse, and interpret communications. Referring to FIG. 3A, the flowchart 300 may begin with receiving an OFDM packet with pilot tones that shift locations of across the bandwidth of the packet periodically (element 302). In many embodiments, the OFDM packet may be received one symbol at a time and the pilot tones may shift to a new location every N symbols, where N may be a settable, calculated or fixed value. Thus, the pilot tones' locations may remain constant for N symbols before shifting to the next location.

After the receiver begins to receive the OFDM packet, the receiver may begin to process pilot tones to determine channel information other than the channel information based on pilot tones that are at locations adjacent to DC and edge tones (element 305). For instance, in some embodiments, the receiver may skip processing pilot tones that are at locations that are adjacent to the DC tone or the edge tones. In other embodiments, the receiver may continue processing the tones but utilize previously determined channel state information and phase correction information that is not determined from pilot tones that are located adjacent to the direct current tone or edge tones. In several embodiments, such information is stored in a buffer or registers.

While processing pilot tones that are not located at symbol indices that are adjacent to the DC and edge tones, the receiver may store the previously determined phase correction information as well as channel state information that is determined by processing pilot tones that are adjacent to locations next to the DC tone and the edge tones (element 310). In other words, the receiver may determine the locations that the pilot tones will shift to prior to receiving the pilot tones so the receiver may comprise logic to determine the locations for which the receiver should store the channel state information so the channel state information is available to the receiver when the pilot tones are shifted into locations that are adjacent to the DC tone or the edge tones.

When the receiver receives OFDM symbols in which one or more of the pilot tones are located adjacent to the DC tone or the edge tones, the receiver may access the buffer in which the previously determined channel state information and phase correction information is stored and retrieve the appropriate information for processing. The information may be processed to determine weight coefficients, allowing the receiver to equalize the pilot tones (element 315). And the receiver may use the previously obtained phase correction information to update the phase of the channel while the pilot tones are at the symbol indices that are adjacent to the DC and edge tones (element 320).

Referring to FIG. 3B, the flowchart 350 begins with a receiver of a station such as the receiver 204 in FIG. 2 receiving a communication signal via one or more antenna(s) such as an antenna element of antenna array 218 (element 355). The communication signal may comprise the pilot tones that shift to new locations every N symbols. Thus, the pilot tone location remains constant for N symbols, then shifts to the next location. The receiver may then use the N pilot symbols to make a channel estimate using an appropriate algorithm. In many embodiments, the receiver may not process or may not use information determined from processing pilot tones adjacent to DC or edge tones. The receiver may use channel updates obtained previously from locations adjacent to the locations that are adjacent to the DC and edge tones. For phase tracking, to avoid any sudden jump in the slope and step of phase correction the receiver may continue to use previously obtained phase correction data.

The receiver may convert the communication signal into one or more MPDUs in accordance with the process described in the preamble (element 360). More specifically, the received signal may be fed from the one or more antennas to a pilot logic such as pilot logic 250 for equalization and phase correction and then to a DBF such as the DBF 220. The DBF transforms the signals into information signals. The output of the DBF is fed to OFDM such as the OFDM 222. The OFDM extracts signal information from the plurality of subcarriers onto which information-bearing signals are modulated. Then, the demodulator such as the demodulator 224 demodulates the signal information via, e.g., BPSK, 16-QAM, 64-QAM, 256-QAM, QPSK, or SQPSK. And the decoder such as the decoder 226 decodes the signal information from the demodulator via, e.g., BCC or LDPC, to extract the one or more MPDUs (element 360) and transmits the one or more MPDUs to MAC sublayer logic such as MAC sublayer logic 202 (element 365).

The MAC sublayer logic may parse and interpret the frame in each of the MPDUs. For instance, the MAC sublayer logic may parse and interpret the frame to determine the frame type and subtype.

The following examples pertain to further embodiments. One example comprises a method. The method may involve receiving an orthogonal frequency division multiplexing transmission with pilot tones shifting locations periodically between symbol indices of orthogonal frequency division multiplexing symbols; processing the pilot tones to determine channel information that excludes channel information for the pilot tones that are located adjacent to a direct current tone or edge tones; and performing channel estimation based upon the channel information.

In some embodiments, the method may further comprise storing phase correction information for pilot tone locations adjacent to locations that are adjacent to the DC tone or the edge tones in memory; and for a pilot tone location that is adjacent to the DC tone or the edge tones, processing previously obtained phase correction information from the memory for phase tracking. In some embodiments, the method may further comprise storing channel state information for pilot tone locations adjacent to locations that are adjacent to the DC tone or the edge tones in memory; and for a pilot tone location that is adjacent to the DC tone or the edge tones, processing previously obtained channel state information from the memory for a location adjacent to the pilot tone location to equalize the pilot tone. In many embodiments, the method may further comprise skipping processing of the pilot tones that are located adjacent to the direct current tone or the edge tones. In several embodiments, the method may further comprise receiving comprises receiving the orthogonal frequency division multiplexing transmission via an antenna array. In several embodiments, processing the pilot tones to determine channel information comprises determining channel state information and phase correction information for the channel. In several embodiments, receiving an orthogonal frequency division multiplexing transmission with pilot tones shifting locations periodically between symbol indices of orthogonal frequency division multiplexing symbols comprises receiving the orthogonal frequency division multiplexing transmission with pilot tones shifting the pilot tones every N orthogonal frequency division multiplexing symbols. And, in some embodiments, receiving an orthogonal frequency division multiplexing transmission with pilot tones shifting locations periodically between symbol indices of orthogonal frequency division multiplexing symbols comprises receiving the orthogonal frequency division multiplexing transmission with pilot tones shifting the pilot tones every orthogonal frequency division multiplexing symbol.

Another example comprises an apparatus. The apparatus may comprise a memory to store channel information; pilot logic coupled with the memory to receive an orthogonal frequency division multiplexing transmission with pilot tones shifting locations periodically between symbol indices of orthogonal frequency division multiplexing symbols; process the pilot tones to determine channel information that excludes channel information for the pilot tones that are located adjacent to a direct current tone or edge tones; and perform channel estimation based upon the channel information.

In some embodiments, the apparatus may further comprise an antenna array coupled with the pilot logic to receive the orthogonal frequency division multiplexing transmission. In some embodiments, the pilot logic comprises logic to store phase correction information for pilot tone locations adjacent to locations that are adjacent to the DC tone or the edge tones in the memory; and, for a pilot tone location that is adjacent to the DC tone or the edge tones, process previously obtained phase correction information from the memory for phase tracking. In some embodiments, the pilot logic comprises logic to store channel state information for pilot tone locations adjacent to locations that are adjacent to the DC tone or the edge tones in the memory; and for a pilot tone location that is adjacent to the DC tone or the edge tones, process previously obtained channel state information from the memory for a location adjacent to the pilot tone location to equalize the pilot tone. In some embodiments, the pilot logic comprises logic to skip processing of the pilot tones that are located adjacent to the direct current tone or the edge tones. In some embodiments, the pilot logic comprises logic to process the pilot tones to determine channel information comprises determining channel state information and phase correction information for the channel. In some embodiments, the pilot logic comprises logic to receive the orthogonal frequency division multiplexing transmission with pilot tones shifting the pilot tones every N orthogonal frequency division multiplexing symbols. And, in some embodiments, the pilot logic comprises logic to receive the orthogonal frequency division multiplexing transmission with pilot tones shifting the pilot tones every orthogonal frequency division multiplexing symbol.

Another example comprises a system. The system may comprise memory to store channel information; a receiver coupled with the memory to receive an orthogonal frequency division multiplexing transmission with pilot tones shifting locations periodically between symbol indices of orthogonal frequency division multiplexing symbols; process the pilot tones to determine channel information that excludes channel information for the pilot tones that are located adjacent to a direct current tone or edge tones; and perform channel estimation based upon the channel information; and a transmitter to transmit a second orthogonal frequency division multiplexing transmission with pilot tones shifting locations periodically.

In some embodiments, the system may further comprise an antenna array coupled with the receiver to receive the orthogonal frequency division multiplexing transmission and the transmitter to transmit the second orthogonal frequency division multiplexing transmission. In some embodiments, the receiver comprises logic to store phase correction information for pilot tone locations adjacent to locations that are adjacent to the DC tone or the edge tones in the memory; and, for a pilot tone location that is adjacent to the DC tone or the edge tones, process previously obtained phase correction information from the memory for phase tracking. In some embodiments, the receiver comprises logic to store channel state information for pilot tone locations adjacent to locations that are adjacent to the DC tone or the edge tones in the memory; and for a pilot tone location that is adjacent to the DC tone or the edge tones, process previously obtained channel state information from the memory for a location adjacent to the pilot tone location to equalize the pilot tone. In some embodiments, the receiver comprises logic to skip processing of the pilot tones that are located adjacent to the direct current tone or the edge tones. In some embodiments, the receiver comprises logic to process the pilot tones to determine channel information comprises determining channel state information and phase correction information for the channel. In some embodiments, the receiver comprises logic to receive the orthogonal frequency division multiplexing transmission with pilot tones shifting the pilot tones every N orthogonal frequency division multiplexing symbols. And, in some embodiments, the receiver comprises logic to receive the orthogonal frequency division multiplexing transmission with pilot tones shifting the pilot tones every orthogonal frequency division multiplexing symbol.

The following examples pertain to further embodiments. One example comprises a machine-accessible product. The machine-accessible product may comprise a medium containing instructions for channel estimation with shifting pilot tones, wherein the instructions, when executed by the access point, causes the access point to perform operations, the operations comprising: receiving an orthogonal frequency division multiplexing transmission with pilot tones shifting locations periodically between symbol indices of orthogonal frequency division multiplexing symbols; processing the pilot tones to determine channel information that excludes channel information for the pilot tones that are located adjacent to a direct current tone or edge tones; and performing channel estimation based upon the channel information.

In some embodiments, the operations may further comprise storing phase correction information for pilot tone locations adjacent to locations that are adjacent to the DC tone or the edge tones in memory; and for a pilot tone location that is adjacent to the DC tone or the edge tones, processing previously obtained phase correction information from the memory for phase tracking. In some embodiments, the operations may further comprise storing channel state information for pilot tone locations adjacent to locations that are adjacent to the DC tone or the edge tones in memory; and for a pilot tone location that is adjacent to the DC tone or the edge tones, processing previously obtained channel state information from the memory for a location adjacent to the pilot tone location to equalize the pilot tone. In many embodiments, the operations may further comprise skipping processing of the pilot tones that are located adjacent to the direct current tone or the edge tones. In several embodiments, the operations may further comprise receiving comprises receiving the orthogonal frequency division multiplexing transmission via an antenna array. In several embodiments, processing the pilot tones to determine channel information comprises determining channel state information and phase correction information for the channel. In several embodiments, receiving an orthogonal frequency division multiplexing transmission with pilot tones shifting locations periodically between symbol indices of orthogonal frequency division multiplexing symbols comprises receiving the orthogonal frequency division multiplexing transmission with pilot tones shifting the pilot tones every N orthogonal frequency division multiplexing symbols. And, in some embodiments, receiving an orthogonal frequency division multiplexing transmission with pilot tones shifting locations periodically between symbol indices of orthogonal frequency division multiplexing symbols comprises receiving the orthogonal frequency division multiplexing transmission with pilot tones shifting the pilot tones every orthogonal frequency division multiplexing symbol.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dipswitch or the like. A user after via a selectable preference such as a software preference, an e-fuse, or the like may select still further features.

A number of embodiments may have one or more advantageous effects. For instance, some embodiments may offer reduced MAC header sizes with respect to standard MAC header sizes. Further embodiments may include one or more advantageous effects such as smaller packet sizes for more efficient transmission, lower power consumption due to less data traffic on both the transmitter and receiver sides of communications, less traffic conflicts, less latency awaiting transmission or receipt of packets, and the like.

Another embodiment is implemented as a program product for implementing systems, apparatuses, and methods described with reference to FIGS. 1-4. Embodiments can take the form of an entirely hardware embodiment, a software embodiment implemented via general purpose hardware such as one or more processors and memory, or an embodiment containing both specific-purpose hardware and software elements. One embodiment is implemented in software or code, which includes but is not limited to firmware, resident software, microcode, or other types of executable instructions.

Furthermore, embodiments can take the form of a computer program product accessible from a machine-accessible, computer-usable, or computer-readable medium providing program code for use by or in connection with a computer, mobile device, or any other instruction execution system. For the purposes of this description, a machine-accessible, computer-usable, or computer-readable medium is any apparatus or article of manufacture that can contain, store, communicate, propagate, or transport the program for use by or in connection with the instruction execution system or apparatus.

The medium may comprise an electronic, magnetic, optical, electromagnetic, or semiconductor system medium. Examples of a machine-accessible, computer-usable, or computer-readable medium include memory such as volatile memory and non-volatile memory. Memory may comprise, e.g., a semiconductor or solid-state memory like flash memory, magnetic tape, a removable computer diskette, a random access memory (RAM), a read-only memory (ROM), a rigid magnetic disk, and/or an optical disk. Current examples of optical disks include compact disk-read only memory (CD-ROM), compact disk-read/write memory (CD-R/W), digital video disk (DVD)-read only memory (DVD-ROM), DVD-random access memory (DVD-RAM), DVD-Recordable memory (DVD-R), and DVD-read/write memory (DVD-R/W).

An instruction execution system suitable for storing and/or executing program code may comprise at least one processor coupled directly or indirectly to memory through a system bus. The memory may comprise local memory employed during actual execution of the code, bulk storage such as dynamic random access memory (DRAM), and cache memories which provide temporary storage of at least some code in order to reduce the number of times code must be retrieved from bulk storage during execution.

Input/output or I/O devices (including but not limited to keyboards, displays, pointing devices, etc.) can be coupled to the instruction execution system either directly or through intervening I/O controllers. Network adapters may also be coupled to the instruction execution system to enable the instruction execution system to become coupled to other instruction execution systems or remote printers or storage devices through intervening private or public networks. Modem, Bluetooth™, Ethernet, Wi-Fi, and WiDi adapter cards are just a few of the currently available types of network adapters.

What is claimed is:

1. A method to perform channel updates with shifting pilot tones, the method comprising:
    receiving an orthogonal frequency division multiplexing transmission with pilot tones shifting locations periodically between symbol indices of orthogonal frequency division multiplexing symbols;
    determining channel information from the pilot tones that excludes channel information for the pilot tones that are located adjacent to part of a transmission bandwidth, which is not used to transmit data tones, comprising a direct current tone or edge tones; and
    performing channel updates based upon the channel information.

2. The method of claim 1, further comprising:
    storing phase correction information for pilot tone locations adjacent to locations that are adjacent to the direct current tone or the edge tones in memory; and
    for a pilot tone location that is adjacent to the direct current tone or the edge tones, processing previously obtained phase correction information from the memory for phase tracking.

3. The method of claim 1, further comprising:
    storing channel state information for pilot tone locations adjacent to locations that are adjacent to the direct current tone or the edge tones in memory; and
    for a pilot tone location that is adjacent to the direct current tone or the edge tones, processing previously obtained channel state information from the memory for a location adjacent to the pilot tone location to equalize the pilot tone.

4. The method of claim 1, further comprising skipping processing of the pilot tones that are located adjacent to the direct current tone or the edge tones.

5. The method of claim 1, wherein receiving comprises receiving the orthogonal frequency division multiplexing transmission via an antenna array.

6. The method of claim 1, wherein determining channel information from the pilot tones comprises determining channel state information and phase correction information for the channel.

7. The method of claim 1, wherein receiving an orthogonal frequency division multiplexing transmission with pilot tones shifting locations periodically between symbol indices of orthogonal frequency division multiplexing symbols comprises receiving the orthogonal frequency division multiplexing transmission with pilot tones shifting the pilot tones every N orthogonal frequency division multiplexing symbols.

8. The method of claim 1, wherein receiving an orthogonal frequency division multiplexing transmission with pilot tones shifting locations periodically between symbol indices of orthogonal frequency division multiplexing symbols comprises receiving the orthogonal frequency division multiplexing transmission with pilot tones shifting the pilot tones every orthogonal frequency division multiplexing symbol.

9. A device to perform channel updates with shifting pilot tones, the device comprising:
    memory to store channel information;
    pilot logic coupled with the memory to receive an orthogonal frequency division multiplexing transmission with pilot tones shifting locations periodically between symbol indices of orthogonal frequency division multiplexing symbols; determine channel information from the pilot tones that excludes channel information for the pilot tones that are located adjacent to part of a transmission bandwidth, which is not used to transmit data tones, comprising a direct current tone or edge tones; and perform channel updates based upon the channel information.

10. The device of claim 9, further comprising a processor, radio, and one or more antennas coupled with the pilot logic to receive the orthogonal frequency division multiplexing transmission.

11. The device of claim 9, wherein the pilot logic comprises logic to store phase correction information for pilot tone locations adjacent to locations that are adjacent to the direct current tone or the edge tones in the memory; and, for a pilot tone location that is adjacent to the direct current tone or the edge tones, process previously obtained phase correction information from the memory for phase tracking.

12. The device of claim 9, wherein the pilot logic comprises logic to store channel state information for pilot tone locations adjacent to locations that are adjacent to the direct current tone or the edge tones in the memory; and for a pilot tone location that is adjacent to the direct current tone or the edge tones, process previously obtained channel state information from the memory for a location adjacent to the pilot tone location to equalize the pilot tone.

13. The device of claim 9, wherein the pilot logic comprises logic to skip processing of the pilot tones that are located adjacent to the direct current tone or the edge tones.

14. The device of claim 9, wherein the pilot logic comprises logic to process the pilot tones to determine channel information comprises determining channel state information and phase correction information for the channel.

15. The device of claim 9, wherein the pilot logic comprises logic to receive the orthogonal frequency division multiplexing transmission with pilot tones shifting the pilot tones every N orthogonal frequency division multiplexing symbols.

16. The device of claim 9, wherein the pilot logic comprises logic to receive the orthogonal frequency division multiplexing transmission with pilot tones shifting the pilot tones every orthogonal frequency division multiplexing symbol.

17. A system to perform channel updates with shifting pilot tones, the system comprising:
   memory to store channel information;
   a receiver coupled with the memory to receive an orthogonal frequency division multiplexing transmission with pilot tones shifting locations periodically between symbol indices of orthogonal frequency division multiplexing symbols; determine channel information from the pilot tones that excludes channel information for the pilot tones that are located adjacent to part of a transmission bandwidth, which is not used to transmit data tones, comprising a direct current tone-or edge tones; and perform channel updates based upon the channel information; and
   a transmitter to transmit a second orthogonal frequency division multiplexing transmission with pilot tones shifting locations periodically.

18. The system of claim 17, further comprising an antenna array coupled with the receiver to receive the orthogonal frequency division multiplexing transmission and the transmitter to transmit the second orthogonal frequency division multiplexing transmission.

19. The system of claim 17, wherein the receiver comprises logic to store phase correction information for pilot tone locations adjacent to locations that are adjacent to the direct current tone or the edge tones in the memory; and, for a pilot tone location that is adjacent to the direct current tone or the edge tones, process previously obtained phase correction information from the memory for phase tracking.

20. The system of claim 17, wherein the receiver comprises logic to store channel state information for pilot tone locations adjacent to locations that are adjacent to the direct current tone or the edge tones in the memory; and for a pilot tone location that is adjacent to the direct current tone or the edge tones, process previously obtained channel state information from the memory for a location adjacent to the pilot tone location to equalize the pilot tone.

21. The system of claim 17, wherein the receiver comprises logic to skip processing of the pilot tones that are located adjacent to the direct current tone or the edge tones.

22. The system of claim 17, wherein the receiver comprises logic to process the pilot tones to determine channel information comprises determining channel state information and phase correction information for the channel.

23. The system of claim 17, wherein the receiver comprises logic to receive the orthogonal frequency division multiplexing transmission with pilot tones shifting the pilot tones every N orthogonal frequency division multiplexing symbols.

24. The system of claim 17, wherein the receiver comprises logic to receive the orthogonal frequency division multiplexing transmission with pilot tones shifting the pilot tones every orthogonal frequency division multiplexing symbol.

25. A machine-accessible product comprising:
   a non-transitory medium containing instructions to perform channel updates with shifting pilot tones, wherein the instructions, when executed by the access point, causes the access point to perform operations, the operations comprising:
   receiving an orthogonal frequency division multiplexing transmission with pilot tones shifting locations periodically between symbol indices of orthogonal frequency division multiplexing symbols;
   determining channel information from the pilot tones that excludes channel information for the pilot tones that are located adjacent to part of a transmission bandwidth, which is not used to transmit data tones, comprising a direct current tone or edge tones; and
   performing channel updates based upon the channel information.

26. The machine accessible product of claim 25, wherein the operations further comprise:
   storing phase correction information for pilot tone locations adjacent to locations that are adjacent to the direct current tone or the edge tones in memory; and
   for a pilot tone location that is adjacent to the direct current tone or the edge tones, processing previously obtained phase correction information from the memory for phase tracking.

27. The machine accessible product of claim 25, wherein the operations further comprise:
   storing channel state information for pilot tone locations adjacent to locations that are adjacent to the direct current tone or the edge tones in memory; and
   for a pilot tone location that is adjacent to the direct current tone or the edge tones, processing previously obtained channel state information from the memory for a location adjacent to the pilot tone location to equalize the pilot tone.

28. The machine accessible product of claim 25, wherein the operations further comprise skipping processing of the pilot tones that are located adjacent to the direct current tone or the edge tones.

29. The machine accessible product of claim 25, wherein processing the pilot tones to determine channel information comprises determining channel state information and phase correction information for the channel.

30. The machine accessible product of claim 25, wherein receiving an orthogonal frequency division multiplexing transmission with pilot tones shifting locations periodically between symbol indices of orthogonal frequency division multiplexing symbols comprises receiving the orthogonal frequency division multiplexing transmission with pilot tones shifting the pilot tones every N orthogonal frequency division multiplexing symbols.

\* \* \* \* \*